United States Patent
Komatsu et al.

(10) Patent No.: US 7,384,991 B2
(45) Date of Patent: Jun. 10, 2008

(54) AQUEOUS INK

(75) Inventors: Hidehiko Komatsu, Nagano (JP); Masahiro Yatake, Nagano (JP); Kazuhiko Hara, Nagano (JP); Masaaki Itano, Nagano (JP); Jun Ito, Nagano (JP); Motoki Masuda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 682 days.

(21) Appl. No.: 10/931,812

(22) Filed: Sep. 1, 2004

(65) Prior Publication Data

US 2005/0124728 A1 Jun. 9, 2005

(30) Foreign Application Priority Data

Sep. 2, 2003 (JP) ............ P.2003-310447
Aug. 30, 2004 (JP) ............ P.2004-250774

(51) Int. Cl.
*C09D 11/00* (2006.01)

(52) U.S. Cl. ............ 523/160; 523/161; 523/200; 523/205; 524/777

(58) Field of Classification Search ............ 523/160, 523/161, 200, 205; 524/777
See application file for complete search history.

(56) References Cited

U.S. PATENT DOCUMENTS

| 6,124,376 | A | * | 9/2000 | Nichols et al. | ............ | 523/160 |
| 7,201,795 | B2 | * | 4/2007 | Takemoto et al. | ............ | 106/31.86 |
| 2003/0144378 | A1 | * | 7/2003 | Mizushima et al. | ............ | 523/160 |
| 2005/0124726 | A1 | * | 6/2005 | Yatake et al. | ............ | 523/160 |

FOREIGN PATENT DOCUMENTS

| EP | 1153992 A1 * | 11/2001 |
| JP | 62-95366 | 5/1987 |
| JP | 01-170672 | 7/1989 |
| JP | 01-301760 | 12/1989 |
| JP | 05-039447 | 2/1993 |
| JP | 05-155006 | 6/1993 |
| JP | 5-64724 | 9/1993 |
| JP | 06-016982 | 1/1994 |
| JP | 06-313141 | 11/1994 |
| JP | 08-218015 | 8/1996 |
| JP | 10-052925 | 2/1998 |
| JP | 10-140065 | 5/1998 |
| JP | 2001-354886 | 12/2001 |
| JP | 2004143386 A * | 5/2004 |
| WO | 03/033602 | 4/2003 |

OTHER PUBLICATIONS

Machine Translation of JP 2004-143386 (2004).*
Patent Abstracts of Japan of JP 01-301760 Dated Dec. 9, 1989.
Patent Abstracts of Japan of JP 01-170672 Dated Jul. 5, 1989.
Patent Abstracts of Japan of JP 05-039447 Dated Feb. 19, 1993.
Patent Abstracts of Japan of JP 06-313141Dated Nov. 8, 1994.
Patent Abstracts of Japan of JP 10-140065 Dated May 26, 1998.
Patent Abstracts of Japan of JP 05-155006 Dated Jun. 22, 1993.
Patent Abstracts of Japan of JP 10-052925 Dated Feb. 24, 1998.
Patent Abstracts of Japan of JP 2001-354886 Dated Dec. 25, 2001.
Patent Abstracts of Japan of JP 06-016982 Dated Jan. 25, 1994.
Patent Abstracts of Japan of JP 08-218015 Dated Aug. 27, 1996.
English Abstract of WO 03/033602 Dated Apr. 24, 2003.

* cited by examiner

*Primary Examiner*—Bernard Lipman
(74) *Attorney, Agent, or Firm*—Ladas and Parry LLP

(57) ABSTRACT

The present invention provides an aqueous ink containing a dispersion in which a colorant is encapsulated with a polymer to make it dispersible in water, wherein the polymer has aromatic rings in an amount of from 20% by weight to 70% by weight based on the weight of the polymer, and further, the ink contains a compound represented by the following formula:

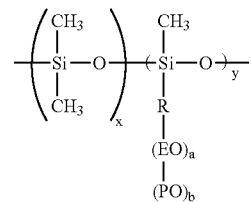

wherein R represents a bivalent organic group, PO represents a propyleneoxy group, EO represents an ethyleneoxy group, x, y, a and b are each the number of repeating units, x represents a number of 1 to 200, y represents a number of 1 to 50, a represents a number of 1 to 30, and b represents a number of 0 to 20.

2 Claims, No Drawings

AQUEOUS INK

FIELD OF THE INVENTION

The present invention relates an aqueous ink, and particularly to an aqueous ink which can provide high print quality to plain paper, recycled paper or coated paper and a glossy medium, and is excellent in fixability and ejection stability.

BACKGROUND OF THE INVENTION

Characteristics which have been demanded for an aqueous ink for an aqueous ink jet printer in recent years include good fastness properties such as water resistance and light resistance of print images, no disadvantages such as an irregular flow of an aqueous ink irrespective of the kind of print medium and a larger spread than an aqueous ink droplet adhered (hereinafter referred to as "a blur"), and high print image density-color reproduction irrespective of the kind of print medium.

Of such purposes, for securing the fastness of print images, it has been studied that pigments excellent in fastness are utilized in place of dyes. Different from the dyes, the pigments have no solubility in water, so that it is necessary to disperse the pigments in water in a finely dispersed state. However, it is very difficult to stably keep this dispersed state. Accordingly, techniques for stably dispersing the pigments in water have been variously proposed. There has been proposed a method using a dispersible surfactant (for example, see patent document 1) or a dispersible polymer having a hydrophobic moiety and a hydrophilic moiety (for example, see patent document 2), as a means therefor. Further, as a method for coating a surface of a colorant with a polymer, there has been proposed a method using microcapsules encapsulating a dye aqueous ink as an aqueous ink for an aqueous ink jet printer (for example, see patent document 3), a method using microencapsulated coloring matter in which coloring matter dissolved or dispersed in a solvent insoluble in water is emulsified in water with a dispersible surfactant (for example, see patent document 4), a method using microcapsules in a recording solution, the microcapsules containing an inclusion in which a subliming disperse dye is dissolved or dispersed in at least one of water, a water-soluble solvent and a polyester (for example, patent document 5), an ink composition comprising colored emulsion-polymerized particles and an aqueous material (for example, patent document 6) or a method according to a phase reversal emulsification reaction or an acid precipitation method (for example, patent document 7).

Further, for realizing print images good in color reproduction, there has been proposed a method of performing image formation by combining a yellow aqueous ink, a magenta aqueous ink, a cyan aqueous ink and a black aqueous ink, in which specific pigments are each dispersed in a water-soluble resin (for example, see patent documents 8 and 9), or a method of performing image formation by combining a yellow aqueous ink, a magenta aqueous ink, a cyan aqueous ink, a black aqueous ink, a green aqueous ink and a red aqueous ink, in which pigments are each dispersed in a water-soluble resin (for example, see patent document 10).

However, the conventional dispersions are unstable, and the presence of the substance having a hydrophobic moiety and a hydrophilic moiety such as a surfactant or a glycol ether results in the easy occurrence of adsorption-desorption, which causes the problem of inferior storage stability of the aqueous ink. In order to reduce blurs to paper, an ordinary aqueous ink necessitates the substance having a hydrophobic moiety and a hydrophilic moiety such as a surfactant or a glycol ether. An aqueous ink not using such a substance becomes insufficient in permeability to paper. In order to perform uniform printing, the kind of paper is limited, and there has been the problem that the deterioration of print images becomes liable to occur.

Further, when an additive as used in the invention (an acetylene glycol, an acetylene alcohol, a silicone surfactant, di(tri)ethylene glycol monobutyl ether, (di)propylene glycol monobutyl ether or a 1,2-alkylene glycol, or a mixture thereof) is used in the conventional dispersion, long-term storage stability is not obtained, and the re-solubility of the aqueous ink is inferior. Accordingly, the aqueous ink has the problem that it is dried, resulting in easy clogging at a nozzle of an aqueous ink jet head or a pen point of a writing material.

Further, when the pigment is dispersed by such a dispersing agent, the residual of the dispersing agent remains in an aqueous ink system, and the dispersing agent does not sufficiently contribute to dispersion to move from the pigment, which caused the problem of increased viscosity. When the viscosity is increased, the added amount of the colorant such as the pigment is limited. Accordingly, sufficient image quality is not obtained, particularly in plain paper.

Then, in order to solve the above-mentioned problems, specifically in order to provide an aqueous ink containing a dispersion which makes it possible to prepare an aqueous ink realizing reduced blurs and high color development on plain paper and having a fixability in addition to sufficient color development on exclusive paper, and which makes it possible to prepare an aqueous ink further excellent in ejection stability in aqueous ink jet recording, the present inventors have disclosed an aqueous ink containing a dispersion in which a colorant is encapsulated with a polymer having aromatic rings in an amount of 20 to 70% by weight to make it dispersible in water (for example, see patent document 11).

Patent Document 1: JP-A-1-301760
Patent Document 2: JP-B-5-64724
Patent Document 3: JP-A-62-95366
Patent Document 4: JP-A-1-170672
Patent Document 5: JP-A-5-39447
Patent Document 6: JP-A-6-313141
Patent Document 7: JP-A-10-140065
Patent Document 8: JP-A-5-155006
Patent Document 9: JP-A-10-52925
Patent Document 10: JP-A-2001-354886
Patent Document 11: Pamphlet of WO03/033602

However, one described in the above-mentioned patent document 11 has not been satisfactory in fixability and ejection stability.

SUMMARY OF THE INVENTION

The invention has been made in view of the above-mentioned problems of the prior art, and intends to provide an aqueous ink which gives high print quality and is excellent in fixability and ejection stability.

Other objects and effects of the invention will become apparent from the following description.

As a result of intensive studies, the inventors have discovered that the fixability and ejection stability are improved by adding an ethyleneoxy-modified silicone having a specific structure as an antifoaming agent, thus completing the invention.

That is to say, the invention is as follows.

(1) An aqueous ink comprising a dispersion in which a colorant is encapsulated with a polymer to make it dispersible in water, wherein the polymer has aromatic rings in an amount of from 20% by weight to 70% by weight based on the weight of the polymer, and further, the ink contains a compound represented by the following formula:

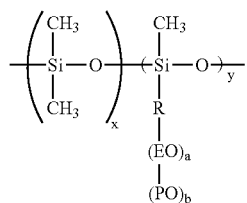

wherein R represents a bivalent organic group, PO represents a propyleneoxy group, EO represents an ethyleneoxy group, x, y, a and b are each the number of repeating units, x represents a number of 1 to 200, y represents a number of 1 to 50, a represents a number of 1 to 30, and b represents a number of 0 to 20.

(2) The aqueous ink according to the above (1), wherein the mol % ratio of EO and Si (EO/Si) in the compound represented by the above-mentioned formula is from 0.8 to 1.5.

The aqueous ink of the invention contains the ethyleneoxy-modified silicone having the specific structure as the antifoaming agent, whereby high print quality has been obtained, and the fixability and ejection stability have become excellent.

DETAILED DESCRIPTION OF THE INVENTION

The aqueous ink of the invention will be described in detail.

The aqueous ink of the invention comprises a dispersion in which a colorant is encapsulated with a polymer to make it dispersible in water, and is characterized in that the polymer has aromatic rings in an amount of from 20% by weight to 70% by weight based on the weight of the polymer, and further, that the ink contains as an antifoaming agent a compound represented by the following formula:

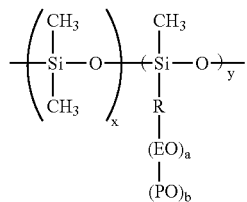

wherein R represents a bivalent organic group, PO represents a propyleneoxy group, EO represents an ethyleneoxy group, and x, y, a and b are each the numbers of repeating units, wherein x represents a number of 1 to 200, y represents a number of 1 to 50, a represents a number of 1 to 30, and b represents a number of 0 to 20.

There is no particular limitation on R in the formula, as long as it is a bivalent organic group, and it may be an aliphatic hydrocarbon group, an aromatic hydrocarbon group or a heteroatom-containing organic group. Above all, an alkylene group having 1 to 10 carbon atoms is preferred.

A siloxane component having an $-Si(CH_3)_2-O-$ component and a side chain (PO)b-(EO)a-R— may be either in a random form or in a block form, irrespective of its existing order in the molecule of the compound represented by the above-mentioned formula (hereinafter also briefly referred to as a modified silicone or an antifoaming agent).

Further, in the above-mentioned side chain, EO and PO may be either in a random form or in a block form, irrespective of their existing order.

In the above-mentioned modified silicone, the number of moles of EO added is not particularly limited, but it is preferably 3 mol or more, more preferably 14 mol or more, and still more preferably 20 mol or more.

Further, in the above-mentioned modified silicone, the mol % ratio of EO and Si (EO/Si) is not particularly limited, but it is preferably from 0.1 to 5.0, more preferably from 0.8 to 1.5, and still more preferably from 0.9 to 1.4. When the ratio is within the above-mentioned range, the ejection stability of the aqueous ink of the invention is further improved.

There is no particular limitation on the molecular weight of the above-mentioned modified silicone, but the average molecular weight is preferably from 200 to 200,000, more preferably from 500 to 20,000, and still more preferably from 1,000 to 10,000.

Further, the HLB value of the above-mentioned modified silicone is not particularly limited, but it is preferably 13 or less, more preferably 10 or less, and still more preferably from 3 to 8.

Specific trade names of the above-mentioned modified silicones include, for example, SH-3771M, SH-3772M, SH-3773M, SH-3775M and SH-3719 (all the above are manufactured by Dow Corning Toray Silicone Co., Ltd.), KF-6017, KF-6028 and KF-352A (all the above are manufactured by Shin-Etsu Chemical Co., Ltd.), Form Ban MS-500, Form Ban MS-525, Form Ban MS-550 and Form Ban MS-575 (all the above are manufactured by Ultra Addives Inc.).

These antifoaming agents are each contained in the ink composition of the invention preferably within the range of 0.0001 to 0.1% by weight, and more preferably within the range of 0.0004 to 0.05% by weight, from the viewpoint of more effectively obtaining reliability (such as clogging and ejection stability) as an ink composition for ink jet recording.

The dispersion which is contained in the aqueous ink of the invention and in which the colorant is encapsulated with the polymer to make it dispersible in water will be described below.

In the dispersion, the polymer encapsulating the colorant is characterized in that the polymer has aromatic rings in an amount of from 20% to 70% based on the weight of the polymer.

When the amount of aromatic rings in the polymer is 20% or more based on the polymer, it becomes possible that the polymer is suitably adsorbed by the colorant having a hydrophobic surface. Further, the adsorbed polymer becomes stable even when an additive suitably used in the invention is added. On the other hand, when the amount of aromatic rings exceeds 70%, it becomes difficult to disperse, conversely resulting in failure to obtain stability. It is more preferably from 25% to 50%.

Further, in the dispersion of the invention, the colorant means a material having a so-called colored molecule, including a pigment and a dye. Then, as the colorant described above, there can be suitably used an organic pigment or an inorganic pigment.

Pigment

The inorganic pigments or organic pigments which can be used as the pigments are exemplified below.

The inorganic pigments for black include carbon blacks (C.I. Pigment Black 7) such as furnace black, lamp black, acetylene black and channel black.

As the organic pigments, there can be used a phthalocyanine pigment, a quinacridone pigment, a condensed azo pigment, an isoindolinone pigment, a quinophthalone pigment, an anthraquinone pigment, a benzimidazolone pigment and a perylene pigment.

Specifically, the organic pigments for yellow include, for example, C.I. Pigment Yellow 1 (Hansa Yellow G), 2, 3 (Hansa Yellow 10G), 4, 5 (Hansa Yellow 5G), 6, 7, 10, 11, 12 (Disazo Yellow AAA), 13, 14, 16, 17, 24 (Flavanthrone Yellow), 55 (Disazo Yellow AAPT), 61, 61:1, 65, 73, 74 (Fast Yellow 5GX), 75, 81, 83 (Disazo Yellow HR), 93 (Condensed Azo Yellow 3G), 94 (Condensed Azo Yellow 6G), 95 (Condensed Azo Yellow GR), 97 (Fast Yellow FGL), 98, 99 (Anthraquinone), 100, 108 (Anthrapyrimidine Yellow), 109 (Isoindolinone Yellow 2GLT), 110(Isoindolinone Yellow 3RLT), 113, 117, 120 (Benzimidazolone Yellow H2G), 123 (Anthraquinone Yellow), 124, 128 (Condensed Azo Yellow G), 129, 133, 138 (Quinophthalone Yellow), 139 (Isoindolinone Yellow), 147, 151 (Benzimidazolone Yellow H4G), 153 (Nickel Nitroso Yellow), 154 (Benzimidazolone Yellow H3G), 155, 156(Benzimidazolone Yellow HLR), 167, 168, 172, 173 (Isoindolinone Yellow 6GL) and 180 (Benzimidazolone Yellow).

Further, the organic pigments for magenta aqueous inks include C.I. Pigment Red 1 (Para Red), 2, 3 (Toluidine Red), 4, 5 (1TR Red), 6, 7, 8, 9, 10, 11, 12, 14, 15, 16, 17, 18, 19, 21, 22, 23, 30, 31, 32, 37, 38 (Pyrazolone Red B), 40, 41, 42, 88 (Thioindigo Bordeaux), 112 (Naphthol Red FGR), 114 (Brilliant Carmine BS), 122 (Dimethylquinacridone), 123 (Perylene Vermilion), 144, 146, 149 (Perylene Scarlet), 150, 166, 168 (Anthoanthorone Orange), 170 (Naphthol Red F3RK), 171 (Benzimidazolone Maroon HFM), 175 (Benzimidazolone Red HFT), 176 (Benzimidazolone Carmine HF3C), 177, 178 (Perylene Red), 179 (Perylene Maroon), 185 (Benzimidazolone Carmine HF4C), 187, 188, 189 (Perylene Red), 190 (Perylene Red), 194 (Perinone Red), 202 (Quinacridone Magenta), 209 (Dichloroquinacridone Red), 214 (Condensed Azo Red), 216, 219, 220 (Condensed Azo), 224 (Perylene Red), 242 (Condensed Azo Scarlet) and 245 (Naphthol Red), C.I. Pigment Violet 19 (Quinacridone), 23 (Dioxadine Violet), 31, 32, 33, 36, 38, 43 and 50.

Furthermore, the organic pigments for cyan include C.I. Pigment Blue 15, 15:1, 15:2, 15:3, 15:4, 15:6 (all the above are Phthalocyanine Blue), 16 (non-metallic Phthalocyanine Blue), 17:1, 18 (alkali blue toner), 19, 21, 22, 25, 56, 60 (Threne Blue), 64 (Dichloroindanthrone Blue), 65 (Violanthrone) and 66 (Indigo).

Further, as the organic pigments for black, there can be used black organic pigments such as Aniline Black (C.I. Pigment Black 1).

Furthermore, the organic pigments used in color aqueous inks other than a yellow, cyan or magenta aqueous ink include C.I. Pigment Orange 1, 2, 5, 7, 13, 14, 15, 16 (Vulcan Orange), 24, 31 (Condensed Azo Orange 4R), 34, 36 (Benzimidazolone Orange HL), 38, 40 (Pyranthrone Orange), 42 (Isoindolinone Orange RLT), 43, 51, 60 (benzimidazolone-based insoluble monoazo pigment), 62 (benzimidazolone-based insoluble monoazo pigment) and 63; C.I. Pigment Green 7 (Phthalocyanine Green), 10 (Green Gold), 36 (chlorobrominated Phthalocyanine Green), 37 and 47 (Violanthrone Green); and C.I. Pigment Brown 1, 2, 3, 5, 23 (Condensed Azo Brown 5R), 25 (Benzimidazolone Brown HFR), 26 (Perylene Bordeaux) and 32 (Benzimidazolone Brown HFL). In the aqueous ink used in the invention, the above-mentioned pigments can be used either alone or as a mixture of two or more of them.

It is desirable that the pigment to be used is previously subjected to pulverization treatment for atomization before the pigment is encapsulated with the polymer into microcapsules (which mean a dispersion). The pulverization treatment of the pigment can be carried out by wet pulverization or dry pulverization using a pulverizing medium such as zirconia beads, glass beads or an inorganic salt, and pulverizers include an attriter, a ball mill and a vibration mill.

When the pigment is atomized by the pulverization treatment, the pigment is conceivably contaminated to no small extent with a component of the pulverizing medium. Specifically, when glass beads are used as the pulverizing medium, the pigment is conceivably contaminated with Si, and in the case of zirconia beads, contamination with Zr is conceivable. Further, contamination from a member of the pulverizer is conceivable. When the pulverizer made of a stainless steel member is used, contamination with Fe, Cr and Ni is conceivable. Accordingly, it is preferred that the contamination components developed from the pulverizing medium and the pulverizer by washing or ultrafiltration of the pigment are removed after the pulverization treatment.

There is also a method of performing the pulverization treatment using a water-soluble inorganic salt (such as NaCl, $BaCl_2$, KCl or $Na_2SO_4$) as the pulverizing medium (salt milling method). In this case, the pulverizing medium component which comes to be mixed by washing with ion exchanged water can be removed theoretically. However, this is a method of mixing the pigment having a large surface area with the inorganic salt as described above. Accordingly, when washing after the pulverization treatment is insufficient, the inorganic salt which is the pulverizing medium is likely to remain in large amounts. Care should therefore be taken.

As a dispersing method, there is available ultrasonic dispersion, bead milling, sand milling, roll milling, jet milling or another known dispersing method.

Of the aqueous inks, when these pigments are used for aqueous ink jet recording, the amount thereof added is preferably from 0.5 to 30%, and more preferably from 1.0 to 12%. When the amount added is less than this, print density becomes unable to be ensured. On the other hand, when the amount added is more than this, an increase in viscosity of the aqueous ink or generation of structural viscosity in viscosity characteristics tends to deteriorate ejection stability of the aqueous ink from an aqueous ink jet head.

Further, the particle size of the pigment is preferably 5 μm or less, more preferably 0.3 μm or less, and still more preferably from 0.01 to 0.15 μm.

Dispersing Polymer

The dispersing polymer used in the aqueous ink of the invention includes the above-mentioned pigment to make it dispersible in water, and the amount of aromatic rings in the polymer is from 20% by weight to 70% by weight. Although a hydrophobic group of a substance forming the dispersing polymer is at least one selected from an alkyl group, a cycloalkyl group and an aromatic ring, it is preferred that the amount of aromatic rings is within the above-mentioned range. In the alkyl group and the cycloalkyl group, an alkyl group having 4 or more carbon atoms is preferred. When the aromatic ring is allowed to be contained in the dispersing polymer, it can be allowed to be contained in the form of an aryl group (specifically, a phenyl group, a naphthyl group or an anthryl group) and/or a derivative thereof, another aromatic ring, or a hetero ring and/or a derivative thereof. Further, it is preferred that the substance forming the above-mentioned dispersing polymer has a hydrophilic functional group, and the hydrophilic functional group is preferably at least a carboxyl group, a sulfonic acid group, a hydroxyl group, an amino group, an amido group or a base thereof. As a specific example of the substance forming the dispersing polymer, there can be used a monomer or an oligomer having a double bond-containing acryloyl group, methacryloyl group, vinyl group or allyl group.

Further, the polymer encapsulating the above-mentioned pigment preferably contains one or more selected from the group consisting of a polyacrylic acid ester, a styrene-acrylic acid copolymer, polystyrene, a polyester, a polyamide, a polyimide, a silicon-containing polymer and a sulfur-containing polymer as a component.

A substance used in the invention which comprises one or more selected from an acetylene glycol-based surfactant, an acetylene alcohol-based surfactant, a silicone-based surfactant, di(tri)ethylene glycol monobutyl ether, (di)propylene glycol monobutyl ether and a 1,2-alkylene glycol causes adsorption-desorption reaction with a dispersing agent used in usual dispersing agent dispersion. Accordingly, the dispersing agent desorbed floats in the aqueous ink, which is liable to cause the phenomenon of disordered printing. However, suitable dispersion is performed using the above-mentioned polymer, thereby stably encapsulating the colorant in the polymer, so that adsorption-desorption is preferably hard to occur.

Furthermore, the colorant in which the above-mentioned pigment is encapsulated with the polymer is preferably one in which the pigment is encapsulated with a copolymer of at least a dispersing agent having a polymerizable group and a copolymerizable monomer. The dispersing agent having a polymerizable group as used herein means one having at least a hydrophobic group, a hydrophilic group and a polymerizable group. The polymerizable group is an acryloyl group, a methacryloyl group, an allyl group or a vinyl group, and the copolymerizable group is also an acryloyl group, a methacryloyl group, an allyl group or a vinyl group. From the viewpoints of clogging and ejection stability, it is preferred that the aqueous ink for aqueous ink jet recording is relatively uniform in particle size. It is therefore preferred that the colorant in which the pigment is encapsulated with the polymer is produced by emulsion polymerization or a phase reversal emulsification method. Further, the firm polymer is formed by using the aromatic rings in the polymer in an amount within the range of the invention, by suitable dispersion with the suitable dispersing agent, and even when the substance comprising one or more selected from an acetylene glycol-based surfactant, an acetylene alcohol-based surfactant, a silicone-based surfactant, di(tri)ethylene glycol monobutyl ether, (di)propylene glycol monobutyl ether and a 1,2-alkylene glycol, which is preferably used in the invention, is added, dispersion stability is preferably obtained to provide long-term stability.

The colorant in which the above-mentioned pigment is encapsulated with the polymer is preferably obtained by dispersing the pigment with the dispersing agent having the polymerizable group, and then, performing emulsion polymerization in water using the monomer copolymerizable with the dispersing agent and a polymerization initiator, or by phase reversal emulsification into water so as to cover the pigment with the polymer.

As the monomer for the dispersing polymer, which is used in the aqueous ink of the invention, specifically, in order to allow the aromatic ring to be contained in the dispersing polymer, there can be used, for example, styrene, an ($\alpha$, 2, 3 or 4)-alkylstyrene, an ($\alpha$, 2, 3 or 4)-alkoxystyrene, 3,4-dimethylstyrene, $\alpha$-phenylstyrene, divinylbenzene, vinylnaphthalene, a styrene macromer, benzyl (meth)acrylate, phenoxyethyl (meth)acrylate or a di(meth)acrylate of an ethylene oxide addition product of bisphenol A or F. Further, as another monomer, there can be used tetrahydrofurfuryl acrylate, butyl methacrylate, dimethylamino (meth)acrylate, dimethylaminoethyl (meth)acrylate, dimethylaminopropylacrylamide, N,N-dimethylaminoethyl acrylate, acryloyl morpholine, N,N-dimethylacrylamide, N-isopropylacrylamide, N,N-diethylacrylamide, methyl (meth)acrylate, ethyl (meth)-acrylate, propyl (meth)acrylate, ethylhexyl (meth) acrylate, another alkyl (meth)acrylate, methoxydiethylene glycol (meth)acrylate, a (meth)acrylate of diethylene glycol or polyethylene glycol with an ethoxy group, a propoxy group or a butoxy group, cyclohexyl (meth)acrylate, isobonyl (meth)acrylate, a hydroxyalkyl (meth)acrylate, another fluorine-, chlorine- or silicon-containing (meth)acrylate, (meth)acrylamide, maleic acid amide or (meth)acrylic acid. Further, when a crosslinked structure is introduced into the dispersing polymer, in addition to the above-mentioned monofunctional monomers, there can be used acrylic group- or methacrylic group-containing compounds such as (mono, di, tri, tetra or poly)ethylene glycol di(meth)acrylate, (meth) acrylates of 1,4-butanediol, 1,5-pentanediol, 1,6-hexanediol, 1,8-octanediol and 1,10-decanediol, trimethylolpropane tri (meth)acrylate, glycerin (di or tri)(meth)acrylate, neopentyl glycol di(meth)acrylate, pentaerythritol tetra(meth)acrylate and dipentaerythritol hexa(meth)acrylate.

Preparation can also be made so as to mainly contain a styrene-acrylic acid copolymer, polystyrene or a polyimide as the aromatic ring-containing polymer and at least one selected from the group consisting of a polyacrylic acid ester, polyester, a polyamide, a silicon-containing dispersing polymer and a sulfur-containing dispersing polymer as another polymer, through the addition of these dispersing polymers.

As the polymerization initiator, there can be used a general initiator used for radical polymerization, such as hydrogen persulfate, azobisisobutyronitrile, benzoyl peroxide, dibutyl peroxide, peracetic acid, cumene hydroperoxide, t-butyl hydroxyperoxide or paramenthane hydroxyperoxide, as well as potassium persulfate or ammonium persulfate.

The dispersing polymer used in the aqueous ink of the invention can also be prepared by emulsion polymerization, and a chain transfer agent can also be used in that case. Examples thereof include n-dodecylmercaptan, n-octylmercaptan, dimethylxanthogen disulfide and diisobutylxanthogen disulfide which are xanthogens, dipentene, indene, 1,4-cyclohexadiene, dihydrofuran and xanthene, as well as t-dodecylmercaptan.

The aqueous ink of the invention is characterized in that the weight ratio of the pigment and the dispersing polymer is within the range of 10:90 to 90:10. Within this range, the dispersion and the aqueous ink using the same are excellent in dispersion stability, and when this dispersion is used in the aqueous ink for an aqueous ink jet printer, a print image not only on plain paper but also on exclusive paper such as a glossy medium (for example, glossy paper) becomes excellent in fixability, color developability and glossiness.

Further, when a black pigment is used as the above-mentioned pigment, the weight ratio of the pigment and the above-mentioned dispersing polymer is within the range of 40:60 to 90:10. It is within the range of 50:50 to 90:10 for a yellow pigment, within the range of 50:50 to 90:10 for a red pigment, and within the range of 30:70 to 70:30 for a blue pigment. Within the above-mentioned range for each pigment, the dispersion and the aqueous ink using the same are excellent in dispersion stability, and a clear print image excellent in fixability, color developability and glossiness is obtained not only on plain paper but also on exclusive paper in aqueous ink jet recording. Even within the above-mentioned range, when the amount of the dispersing polymer is small to the pigment, even the addition of a relatively large amount of the dispersion to the aqueous ink can decrease the concentration of solid matter in the aqueous ink, in the case where this dispersion is used in the aqueous ink for aqueous ink jet recording. Accordingly, clogging at a tip of a nozzle due to drying of the aqueous ink is hard to occur, and particularly, the aqueous ink excellent in color developability on plain paper is easily prepared. However, glossiness and fixability on a glossy medium are hard to be obtained in some cases. Conversely, when the amount of the dispersing polymer is large to the pigment, the concentration of solid matter in the aqueous ink increases, in the case where a relatively large amount of the dispersion is added to the aqueous ink in order to enhance color developability on plain paper. Accordingly, clogging at a tip of a nozzle due to drying of the aqueous ink becomes easy to occur. However, glossiness and fixability on a glossy medium are easily obtained. Accordingly, in view of a balance of both, when a black pigment is used as the above-mentioned pigment, the weight ratio of the pigment and the above-mentioned dispersing polymer is more preferably within the range of 50:50 to 70:30. It is more preferably within the range of 60:40 to 80:20 for a yellow pigment, within the range of 60:40 to 90:10 for a red pigment, and within the range of 40:60 to 70:30 for a blue pigment. The reason why the preferred range of the weight ratio of the pigment and the dispersing polymer varies depending on each pigment as described above is not clear for details. However, it is presumed that each pigment is different in a surface state of its particle, which affects an adsorbed state of the dispersing polymer and a surface state of the dispersion. However, this presumption is not limited in the invention.

The use of the dispersion containing the pigment and dispersing polymer described above as constituent elements can provide the aqueous ink suitable for aqueous ink jet printing excellent in storage stability. Further, in the aqueous ink of the invention, an image reduced in blurs and having good fixability and color reproduction can be formed, irrespective of the kind of print medium such as plain paper or a glossy medium, by containing a water-soluble organic solvent as described later. In addition, the above-mentioned dispersion can also be suitably used in an aqueous ink for a writing material.

Further, the colorant in which the above-mentioned pigment is encapsulated with the polymer is preferably one in which the pigment is encapsulated with the copolymer of at least the dispersing agent having a polymerizable group and the copolymerizable monomer. The dispersing agent having a polymerizable group as used herein means one having at least a hydrophobic group, a hydrophilic group and a polymerizable group. The polymerizable group is an acryloyl group, a methacryloyl group, an allyl group or a vinyl group, and the copolymerizable group is also an acryloyl group, a methacryloyl group, an allyl group or a vinyl group.

From the viewpoints of clogging and ejection stability, it is preferred that the aqueous ink for aqueous ink jet recording is relatively uniform in particle size. It is therefore preferred that the colorant in which the pigment is encapsulated with the polymer is produced by emulsion polymerization or a phase reversal emulsification method. Further, the firm polymer is formed by using the aromatic rings in the polymer in an amount within the range of the invention, by suitable dispersion with the suitable dispersing agent, and dispersion stability is preferably obtained to provide long-term stability.

The dispersion in which the above-mentioned pigment is encapsulated with the polymer is preferably one obtained by dispersing the pigment with the dispersing agent having the polymerizable group, and then, performing emulsion polymerization in water using the monomer copolymerizable with the dispersing agent and the polymerization initiator.

Aqueous Ink

In order to enhance permeability of the aqueous ink to the recording medium such as paper, a penetrating agent is added to the aqueous ink of the invention in some cases. Further, in order to more improve the securement of standing stability thereof and achieve stable ejection thereof from an aqueous ink ejection head, various additives such as a humectant, a dissolving assistant, a penetration controlling agent (penetrating agent), a viscosity adjuster, a pH adjuster, an antioxidant, an antifungal agent, a corrosion inhibitor and a chelate for capturing a metal ion affecting dispersion are added in some cases.

Penetrating Agent

The penetrating agent improves drying properties of printed matter by addition thereof, and a previous print portion is not transferred to a back side of a subsequent medium, even when continuously printed. Accordingly, the penetrating agent particularly makes it possible to speed up print recording. Further, when used in the aqueous ink for an aqueous ink jet printer, the penetrating agent is particularly suitable which is reduced in foaming and has the characteristic of being hard to be dried in a nozzle of an aqueous ink jet head.

Such a penetrating agent is preferably one or two or more selected from an acetylene glycol-based surfactant, an acetylene alcohol-based surfactant, a glycol ether and an alkylene glycol. By using these penetrating agents, blurs on plain paper can be reduced, and the line width on a glossy medium can be adjusted to a suitable degree.

Specific trade names of the acetylene glycol-based surfactants or the acetylene alcohol-based surfactants suitably available as the penetrating agent include, for example, Surfynol TG, Surfynol 104, Surfynol 420, Surfynol 440, Surfynol 465, Surfynol 485, Surfynol 61 and Surfynol 82 (all the above are manufactured by Air Products and Chemicals Inc.), Olfine E1010, Olfine E1004 and Olfine STG (all the above are manufactured by Nissin Chemical Industry Co., Ltd.), and Acetylenol E00, Acetylenol E40 and Acetylenol E100 (all the above are manufactured by Kawaken Fine Chemicals Co., Ltd.).

The glycol ethers suitably available as the penetrating agent include a diethylene glycol monoalkyl (having 4 to 8 carbon atoms) ether, a triethylene glycol monoalkyl (having 4 to 8 carbon atoms) ether, a propylene glycol monoalkyl (having 3 to 6 carbon atoms) ether and a dipropylene glycol monoalkyl (having 3 to 6 carbon atoms) ether. Specific examples thereof include diethylene glycol monobutyl ether, triethylene glycol monobutyl ether, propylene glycol monobutyl ether and dipropylene glycol monobutyl ether.

The alkylene glycols available as the penetrating agent include a 1,2-alkyl (having 4 to 10 carbon atoms) diol, a 1,3-alkyl (having 4 to 10 carbon atoms) diol, 1,5-alkyl (having 0.4 to 10 carbon atoms) diol and 1,6-alkyl (having 4 to 10 carbon atoms) diol. Specific examples thereof include 1,2-pentanediol, 1,2-hexanediol, 1,3-butanediol, 1,5-pentanediol and 1,6-hexanediol.

The above-mentioned glycol ether and/or alkylene glycol improve drying properties of print by addition thereof, and a previous print portion is not transferred to a back side of a subsequent medium, even when continuously printed. Accordingly, high-speed printing becomes possible, particularly in aqueous ink jet recording. Further, the above-mentioned glycol ether and/or alkylene glycol also have the characteristic as a dissolving assistant to other slightly soluble aqueous ink additives. For example, when, of the above-mentioned acetylene glycols, a compound low in solubility in water when used alone is used, it is added in combination with the glycol ether, thereby being able to enhance solubility of the acetylene glycol to increase the amount thereof added.

Still further, the glycol ether and/or the alkylene glycol have bactericidal and antibacterial actions to no small extent, so that they also have the effect of being able to inhibit the occurrence of microorganisms and bacteria by containing them in the aqueous ink in an amount of about 3 to 5%.

In the aqueous ink of the invention, the above-mentioned acetylene glycol-based surfactant, acetylene alcohol-based surfactant, glycol ether and alkylene glycol can be used either alone or together as the penetrating agent, and the amount thereof added to the aqueous ink is preferably from 0.01 to 30% by weight, and more preferably from 0.1 to 10% by weight. When the amount added is less than 0.01% by weight, the effect of improving print quality decreases. Exceeding 30% by weight results in non-uniform wetting around a nozzle of an aqueous ink ejection head, which causes the difficulty of stable ejection.

It is preferred that one or more selected from the above-mentioned acetylene glycol-based surfactant and acetylene alcohol-based surfactant are contained in an amount of 0.1% to 5%. Exceeding 5% results in the peak out of the effect of print quality, an increase in viscosity to cause the difficulty to use even when added and easy adherence of the aqueous ink to a tip of a head, thereby being liable to bring about disordered printing. Less than 0.1% results in a decrease in the effect of improving print quality. The amount added is more preferably from 0.15 to 2%.

It is preferred that at least one or more selected from the above-mentioned acetylene glycol-based surfactant and acetylene alcohol-based surfactant and one or more selected from di(tri)ethylene glycol monobutyl ether, (di)propylene glycol monobutyl ether and a 1,2-alkylene glycol are added at the same time. The print quality is improved by using the acetylene glycol-based and/or acetylene alcohol-based surfactant and one or more selected from di(tri)ethylene glycol monobutyl ether, (di)propylene glycol monobutyl ether and a 1,2-alkylene glycol at the same time.

Then, it is preferred that one or more selected from the above-mentioned acetylene glycol-based surfactant and acetylene alcohol-based surfactant are used in an amount of 0 to 0.5%, and that one or more selected from di(tri)ethylene glycol monobutyl ether, (di)propylene glycol monobutyl ether and a 1,2-alkylene glycol are used in an amount of 1% or more. One or more selected from the acetylene glycol-based surfactant and the acetylene alcohol-based surfactant have the effect of improving permeability even when used in small amounts. Accordingly, when its amount is 0.5% or less and one or more selected from di(tri)ethylene glycol monobutyl ether, (di)propylene glycol monobutyl ether and a 1,2-alkylene glycol are used in an amount of 1% or more, the print quality is more improved.

Besides, as the penetrating agent of the aqueous ink of the invention, there can be similarly used the above-mentioned alcohol, a nonionic surfactant, a water-soluble organic solvent or another surfactant.

In the aqueous ink used in the invention, the above-mentioned penetrating agents can be used either alone or as a combination of two or more of them. In particular, it is preferred that the above-mentioned alkylene glycol monoalkyl ether comprises an alkylene glycol having 10 or more repeating units and an alkyl ether having 3 to 10 carbon atoms. Of these, di(tri)ethylene glycol monobutyl ether and/or (di)propylene glycol monobutyl ether are preferred, and the above-mentioned 1,2-alkylene glycol is preferably 1,2-hexanediol and/or 1,2-pentanediol.

Further, a substance comprising one or more selected from the above-mentioned di(tri)ethylene glycol monobutyl ether, (di)propylene glycol monobutyl ether and 1,2-alkylene glycol is added preferably in an amount of 0.5% to 30%, and more preferably in an amount of 1% to 15%.

Then, it is preferred in terms of print quality that at least one or more selected from the above-mentioned acetylene glycol-based surfactant and acetylene alcohol-based surfactant and one or more selected from di(tri)ethylene glycol monobutyl ether, (di)propylene glycol monobutyl ether and a 1,2-alkylene glycol are added at the same time.

Then, it is preferred that one or more selected from the above-mentioned acetylene glycol-based surfactant and acetylene alcohol-based surfactant are used in an amount of 0.01 to 1.0%, and that one or more selected from di(tri)ethylene glycol monobutyl ether, (di)propylene glycol monobutyl ether and a 1,2-alkylene glycol are used in an amount of 1% or more. One or more selected from the acetylene glycol-based surfactant and the acetylene alcohol-based surfactant have the effect of improving permeability even when used in small amounts. Accordingly, even when its amount is 1.0% or less, the print quality is further improved be the addition of one or more selected from di(tri)ethylene glycol monobutyl ether, (di)propylene glycol monobutyl ether and a 1,2-alkylene glycol in an amount of 1% or more.

The above-mentioned 1,2-alkylene glycol is preferably a 1,2-alkylene glycol having 4 to 10 carbon atoms. The amount thereof added is preferably 10% or less, but is not limited thereto for writing material application. It is more preferably from 1% to 8%.

Further, di(tri)ethylene glycol monobutyl ether indicates diethylene glycol monobutyl ether and/or triethylene glycol monobutyl ether. As the necessary level of permeability for improving print quality, it is added preferably in an amount of 20% or less, and more preferably in an amount of 0.5 to 10%.

In the aqueous ink of the invention, in order to control permeability of the aqueous ink, and further improve clogging resistance of a nozzle, moisture retention of the aqueous ink, or solubility of the penetrating agent, the above-mentioned or another surfactant, a high boiling low-volatile polyhydric alcohol and a hydrophilic high boiling low-volatile solvent such as a monoetherified product, dietherified or esterified product thereof can be used either alone or as a combination of two or more of them, as an assistant for the above-mentioned penetrating agent. They are preferably used in an amount of 1% to 8%.

The above-mentioned 1,2-alkylene glycol is preferably a 1,2-alkylene glycol having 4 to 10 carbon atoms, and the amount thereof added is preferably 10% or less. Exceeding 10% results in an increase in viscosity to cause the difficulty to use for aqueous ink jet application, and the effect of improving print quality is not obtained even when it is more added. However, the amount is not limited thereto for writing material application.

Further, the above-mentioned 1,2-alkylene glycol is preferably 1,2-pentanediol or 1,2-hexanediol. 1,2-Pentanediol is preferably added in an amount of 3 to 10%. Less than 3% results in a decrease in the effect of improving permeability, so that the occurrence of blurs is increased. When the carbon number exceeds 10, the viscosity becomes high. It is therefore difficult to use in a water-soluble aqueous ink such as the ink of the invention. 1,2-Hexanediol is preferably used in an amount of 0.5 to 10%. Less than 3% results in a decrease in the effect of improving permeability. When the carbon number exceeds 10, the water solubility is low. It is therefore difficult to use in a water-soluble aqueous ink such as the ink of the invention. When the amount of the above-mentioned acetylene glycol-based and/or acetylene alcohol-based surfactant added is 0.5% or more, the ratio thereof to the 1,2-alkylene glycol is preferably from 1:0 to 1:50 from the viewpoint of print quality. When the 1,2-alkylene glycol exceeds 50 times the acetylene glycol-based and/or acetylene alcohol-based surfactant, the effect of improving print quality reaches the peak, and the effect is low even when it is more added. Conversely, the adverse effect of an increase in viscosity occurs.

Then, the above-mentioned (di)propylene glycol monobutyl ether is preferably contained in an amount of 10% or less. Exceeding 10% results in the peak out of the effect of improving print quality. Conversely, the adverse effect of an increase in viscosity occurs, and the addition of a dissolving assistant becomes necessary because of low water solubility. It is more preferably contained in an amount of 0.5 to 5%.

It is preferred that the ratio of the above-mentioned acetylene glycol-based and/or acetylene alcohol-based surfactant and (di)propylene glycol monobutyl ether is from 1:0 to 1:10. When (di)propylene glycol monobutyl ether exceeds 10 times the acetylene glycol-based and/or acetylene alcohol-based surfactant, the effect of improving print quality reaches the peak, and the effect is low even when it is more added. Conversely, the adverse effect of an increase in viscosity occurs.

The above-mentioned di(tri)ethylene glycol monobutyl ether is preferably contained in an amount of 20% or less. Exceeding 20% results in an increase in viscosity to cause the difficulty to use, and the effect of improving print quality is not obtained even when it is more added. More preferably, it is contained in an amount of 1% to 15%.

Di(tri)ethylene glycol monobutyl ether indicates diethylene glycol monobutyl ether (DEGmBE) and/or triethylene glycol monobutyl ether (TEGmBE). As the necessary level of permeability for improving print quality, it is preferably added in an amount of 20% or less. Exceeding 20% results in the peak out of the effect of improving print quality. Conversely, the adverse effect of an increase in viscosity occurs. More preferably, it is added in an amount of 0.5 to 10%.

It is preferred that the amount of the above-mentioned acetylene glycol-based and/or acetylene alcohol-based surfactant added is 0.5% or more, and that the ratio thereof to di(tri)ethylene glycol monobutyl ether is from 1:0 to 1:50. It is preferred from the viewpoint of print quality that it is added up to 50 times the acetylene glycol-based and/or acetylene alcohol-based surfactant. Di(tri)ethylene glycol monobutyl ether serves to improve solubility of the acetylene glycol-based surfactant and print quality. However, when the amount added exceeds 50 times, these effects reach the peak, which makes it difficult to use for aqueous ink jet recording.

Humectant

Water-soluble glycols for inhibiting drying at an aqueous ink jet nozzle face or a pen point include ethylene glycol, diethylene glycol, triethylene glycol, propylene glycol, dipropylene glycol, tripropylene glycol, polyethylene glycol having a molecular weight of 2,000 or less, 1,3-propylene glycol, isopropylene glycol, isobutylene glycol, thiodiglycol, 1,4-butanediol, 1,3-butanediol, 1,5-pentanediol, 1,6-hexanediol, glycerol, mesoerythritol, pentaerythritol, trimethylolethane, trimethylolpropane, 1,4-cyclohexanediol, 1,4-cyclohexanedimethanol and cyclohexanethiol.

In the invention, in order to inhibit clogging of a nozzle on a front face thereof caused by drying of the aqueous ink, many kinds of saccharides can also be used. The saccharides include monosaccharides and polysaccharides, and there can be used alginic acid and a salt thereof, a cyclodextrin and a cellulose, as well as glucose, mannose, fructose, ribose, xylose, arabinose, lactose, galactose, an aldonic acid, glucitose, maltose, cellobiose, sucrose, trehalose and maltotriose. They are added preferably in an amount of 0.05% to 30%. Glucose, mannose, fructose, ribose, xylose, arabinose, lactose, galactose, an aldonic acid, glucitose, maltose, cellobiose, sucrose, trehalose and maltotriose which are monosaccharides and polysaccharides, general saccharides, are added more preferably in an amount of 3% to 20%. Alginic acid and a salt thereof, a cyclodextrin and a cellulose are required to be added in such an amount that the viscosity of the aqueous ink does not excessively increase.

In addition, glycol ethers having compatibility with water and low in solubility in water contained in the aqueous ink, and ones which can be used for improving solubility of aqueous ink components, further improving permeability to a medium to be recorded, for example, paper, or preventing clogging of a nozzle or a pen point include an alkyl alcohol having 1 to 4 carbon atoms such as ethanol, methanol, butanol, propanol or isopropanol, a glycol ether such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxy-butanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether or dipropylene glycol mono-n-butyl ether, formaldehyde, acetamide, dimethyl sulfoxide, sorbit, sorbitan, acetin, diacetin, triacetin and sulfolane. These can be suitably selected to use.

Other Additives

Various additives such as a humectant, a dissolving assistant, a penetration controlling agent, a viscosity adjuster, a pH adjuster, an antioxidant, an antifungal agent, a corrosion inhibitor and a chelate for capturing a metal ion affecting dispersion are added to the aqueous ink for aqueous ink jet recording in the invention in some cases, in order to secure standing stability thereof and achieve stable ejection thereof from an aqueous ink ejection head. Those will be exemplified below.

In order to inhibit drying at an aqueous ink jet nozzle face or a pen point, the water-soluble glycol is preferably added. Examples thereof include ethylene glycol, diethylene glycol, triethylene glycol, propylene glycol, dipropylene glycol, tripropylene glycol, polyethylene glycol having a molecular weight of 2,000 or less, 1,3-propylene glycol, isopropylene glycol, isobutylene glycol, 1,4-butanediol, 1,3-butanediol, 1,5-pentanediol, 1,6-hexanediol, glycerol, mesoerythritol and pentaerythritol.

Further, in the invention, in order to inhibit clogging of a nozzle on a front face thereof caused by drying of the aqueous ink, many kinds of saccharides can also be used. The saccharides include monosaccharides and polysaccharides, and there can be used alginic acid and a salt thereof, a cyclodextrin and a cellulose, as well as glucose, mannose, fructose, ribose, xylose, arabinose, lactose, galactose, an aldonic acid, glucitose, maltose, cellobiose, sucrose, trehalose and maltotriose. They are added preferably in an amount of 0.05% to 30%. Less than 0.05% results in a decrease in the effect of restoring the clogging phenomenon that the aqueous ink is dried at a tip of a nozzle to cause clogging, whereas exceeding 30% results in an increase in viscosity of the aqueous ink to fail to perform suitable printing. Glucose, mannose, fructose, ribose, xylose, arabinose, lactose, galactose, an aldonic acid, glucitose, maltose, cellobiose, sucrose, trehalose and maltotriose which are monosaccharides and polysaccharides, general saccharides, are added more preferably in an amount of 3% to 20%. Alginic acid and a salt thereof, a cyclodextrin and a cellulose are required to be added in such an amount that the viscosity of the aqueous ink does not excessively increase.

In addition, glycol ethers having compatibility with water and low in solubility in water contained in the aqueous ink, and ones which can be used for improving solubility of aqueous ink components, further improving permeability to a medium to be recorded, for example, paper, or preventing clogging of a nozzle or a pen point include an alkyl alcohol having 1 to 4 carbon atoms such as ethanol, methanol, butanol, propanol or isopropanol, a glycol ether such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxy-butanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether or dipropylene glycol mono-n-butyl ether, formaldehyde, acetamide, dimethyl sulfoxide, sorbit, sorbitan, acetin, diacetin, triacetin and sulfolane. These can be suitably selected to use.

Further, in order to control permeability to a medium such as paper or special paper, it is also possible to further add another surfactant to the aqueous ink according to the invention. The surfactant to be added is preferably a surfactant having good compatibility with the aqueous ink system of the invention. Of surfactants, it is preferably one which is high in permeability and stable. Examples thereof include an amphoteric surfactant and a nonionic surfactant. The amphoteric surfactants include lauryl dimethylaminoacetic acid betaine, a 2-alkyl-N-carboxymethyl-N-hydroxyethylimidazolinium betaine, coconut oil fatty acid amide propyldimethylaminoacetic acid betaine, polyoctyl polyaminoethyl glycine and other imidazoline derivatives. Examples of nonionic surfactants include an ether-based surfactant such as polyoxyethylene nonylphenyl ether, polyoxyethylene octylphenyl ether, polyoxyethylene dodecylphenyl ether, a polyoxyethylene alkylallyl ether, polyoxyethylene oleyl ether, polyoxyethylene lauryl ether, a polyoxyethylene alkyl ether or a polyoxyalkylene alkyl ether (polyoxypropylene polyoxyethylene alkyl ether), an ether-based surfactant such as polyoxyethylene oleic acid, polyoxyethylene oleic acid ester, polyoxyethylene distearic acid ester, sorbitan laurate, sorbitan monostearate, sorbitan monooleate, sorbitan sesquioleate, polyoxyethylene monooleate or polyoxyethylene stearate, and a fluorine-containing surfactant such as a fluoroalkyl ester or a perfluoroalkyl carbonate.

Further, the pH adjusters, the dissolving assistants or the antioxidants include an amine such as diethanolamine, triethanolamine, propanolamine or morpholine and a modified product thereof, an inorganic salt such as potassium hydroxide, sodium hydroxide or lithium hydroxide, ammonium hydroxide, a quaternary ammonium hydroxide (such as tetramethylammonium), a carbonate such as potassium (hydrogen) carbonate, sodium (hydrogen) carbonate or lithium (hydrogen) carbonate, a phosphate, N-methyl-2-pyrrolidone, a urea such as urea, thiourea or tetramethylurea, an allophanate such as allophanate or methyl allophanate, a biuret such as biuret, dimethylbiuret or tetramethylbiuret, L-ascorbic acid and a salt thereof. Further, commercially available antioxidants and ultraviolet absorbers can also be used. Examples thereof include Tinuvin 328, 900, 1130, 384, 292, 123, 144, 622, 770 and 292, Irgacor 252 and 153, Irganox 1010, 1076, 1035 and MD 1024, and an oxide of a lanthanide, which are manufactured by Ciba-Geigy Corporation.

Furthermore, the viscosity adjusters include a rosin, an alginic acid, polyvinyl alcohol, hydroxypropylcellulose, carboxymethylcellulose, hydroxyethylcellulose, methyl-cellulose, a polyacrylate, polyvinylpyrrolidone and gum arabic starch.

The pH adjuster is preferably added in such an amount that the pH value of the aqueous ink reaches about 7 to 10, form the viewpoints of durability of a head member and stability of the aqueous ink.

Further, the pigment dispersion of the invention and the aqueous ink containing the same can contain another additive, for example, benzoic acid, dichlorophene, hexachlorophene, sorbic acid, p-hydorxybenzoate, ethylene-diamine-tetraacetate (EDTA), sodium dehydroacetate, 1,2-benzothiazoline-3-one, 3,4-isothiazoline-3-one, an oxazolidine compound such as 4,4-dimethyloxazolidine, an alkylisothiazolone, a chloroalkylisothiazolone, benzisothiazolone, bromonitroalcohol and/or chloroxylenol, as the antifungal agent, the preservative or the corrosion inhibitor, as needed. Furthermore, in order to prevent a nozzle from being dried, urea, thiourea and/or ethyleneurea can also be contained.

Physical Properties of Aqueous Ink

The physical properties of the aqueous ink of the invention can be suitably controlled. However, according to a preferred embodiment, the viscosity of the aqueous ink is preferably 10 mPa·sec or less, and more preferably 5 mPa·sec or less (20° C.). The aqueous ink within this viscosity range is stably ejected from an aqueous ink ejection head. Further, although the surface tension of the aqueous ink can also be suitably controlled, it is preferably from 25 to 50 mN/m (20° C.), and more preferably from 30 to 40 mN/m (20° C.)

Aging Treatment of Aqueous Ink

When the above-mentioned surfactant or water-soluble organic solvent is added to the aqueous ink of the invention, the time is required until the respective physical property values are stabilized after addition in some cases. In such a case, the ink may be subjected to aging treatment such as heating as needed.

The heating temperature at the time when such aging treatment is conducted is preferably within the range of room temperature (25° C.) to 100° C., and more preferably within the range of 40° C. to 80° C. The time for which the aging treatment is conducted is within the range of about several minutes to about several days, and more preferably within the range of several hours to 24 hours. However, conditions of such aging treatment vary depending on the kind of pigment or resin used, so that the conditions of the aging treatment are not particularly limited, as long as the necessary effect is obtained.

For example, the aging treatment is conducted at a heating temperature of 70° C. for a treating time of about 12 to 24 hours, thereby being able to stabilize the respective properties of the ink.

Further, for the zeta potential of the aqueous ink of the invention, when it is measured as a diluted solution diluted with ion exchanged water to a dispersion concentration of 0.001 to 0.01% by weight, the absolute value of the zeta potential of the dispersion at 20° C. at pH 8 to 9 is preferably 40 mV or more, more preferably 45 mV or more, and still more preferably 50 mV or more. When the absolute value of the zeta potential of the dispersion is 20 mV or less, storage stability of the aqueous ink is deteriorated.

EXAMPLES

The present invention will be illustrated in greater detail with reference to the following Examples, but the invention should not be construed as being limited thereto.

Respective measurements (amount of aromatic rings, pigment/polymer ratio, average particle size and surface tension) obtained in Examples were measured by the following methods:

Measurement of Amount of Aromatic Rings

A dispersing polymer solution obtained in each Example or Comparative Example was partially taken out, and solvent components were removed by distillation to take out only a polymer component, which was dissolved in DMSO-$d_6$. Then, the amount of aromatic rings in the polymer was measured using $^{13}$C-NMR and $^1$H-NMR (AMX 400 manufactured by Bruker (Germany)).

Measurement of Pigment/Polymer Ratio

A dispersion obtained in each Example or Comparative Example was partially taken out, and HCl having a concentration of 0.1 mol/liter was added thereto to allow only the dispersion to undergo acid precipitation, followed by measurement of the dry weight thereof. Then, only the dispersing polymer was taken out by the Soxhlet extraction method using acetone, and the dry weight thereof was measured, thereby calculating the pigment/polymer weight ratio.

Measurement of Average Particle Size

An aqueous ink obtained in each Example or Comparative Example was diluted with ion exchanged water to a dispersion concentration of 0.001 to 0.01% by weight (because the optimum concentration in measurement was somewhat different depending on the ink), and the average particle size of dispersion particles at 20° C. was measured with a size distribution meter (DLS-800 manufactured by Otsuka Electronics Co., Ltd.).

Example 1

(1) Production of Dispersion: Dispersion 1

For the production of dispersion 1 used in Example 1, Color Black S170 (manufactured by Degussa-Huels AG), a carbon black pigment which is an inorganic pigment, was used.

First, the internal atmosphere of a reaction vessel equipped with a stirrer, a thermometer, a reflux condenser and a dropping funnel was replaced with nitrogen, and then, 22 parts of styrene, 5 parts of α-methylstyrene, 15 parts of butyl methacrylate, 10 parts of lauryl methacrylate, 2.5 parts of acrylic acid and 0.3 part of t-dodecylmercaptan were put therein, followed by heating at 70° C. Then, 150 parts of styrene, 15 parts of acrylic acid, 50 parts of butyl methacrylate, 1 part of t-dodecylmercaptan, 20 parts of methyl ethyl ketone and 3 parts of azobisisobutyronitrile separately prepared were put in the dropping funnel, and added dropwise to the reaction vessel, taking 4 hours, to conduct polymerization reaction, thereby obtaining a dispersing polymer. Then, methyl ethyl ketone was added to the reaction vessel to prepare a dispersing polymer solution having a concentration of 40%.

This dispersing polymer solution was partially taken out, and the solvent components were removed by distillation. Then, the ratio of aromatic rings to the total weight was measure by the method described in the above-mentioned "Measurement of Amount of Aromatic Rings". As a result, the amount of aromatic rings to the total weight of the dispersing polymer was 58%.

Forty parts of the above-mentioned dispersing polymer solution, 30 parts of Color Black S170 (manufactured by Degussa-Huels AG), a carbon black pigment, 100 parts of a 0.1 mol/liter aqueous solution of sodium hydroxide and 35 parts of methyl ethyl ketone were mixed, and dispersed with a homogenizer for 30 minutes or more. Then, 350 parts of ion exchanged water was added, followed by dispersion for further 1 hour. The total amount of methyl ethyl ketone and part of water were removed by distillation using a rotary evaporator, and thereafter, separation by filtration and washing were repeated with a Buchner funnel. Then, ion exchanged water and an aqueous solution of sodium hydroxide as a neutralizing agent were appropriately added to a pigment-encapsulating resin dispersion separated by filtration with stirring to adjust the dispersion to pH 7.5. The resulting dispersion was filtered through a filter having an average pore size of 0.5 μm to obtain dispersion 1 containing dispersion 1 (a dispersion in which the carbon black pigment is encapsulated with the polymer having an aromatic ring amount of 58%) in an amount of 20%.

The pigment/polymer ratio in dispersion 1 was measured by the method described in the above-mentioned "Measurement of Pigment/Polymer Ratio". As a result, it was 80:20.

(2) Preparation of Ink

In Example 1, there were used dispersion 1 obtained in Example 1 (1) described above, SH-3771M (manufactured by Dow Corning Toray Silicone Co., Ltd.; HLB value=13), an EO-modified silicone, Olfine E1010 (manufactured by Nissin Chemical Industry Co., Ltd.), an acetylene glycol-based surfactant, diethylene glycol monobutyl ether, an alkylene glycol monoalkyl ether, and 1,2-pentanediol, a 1,2-alkylene glycol. The specific composition is shown below.

A value in < > indicates the average particle size (unit: nm) of dispersion 1 measured by the method described in the above-mentioned "Measurement of Average Particle Size".

Further, Proxel XL-2 (manufactured by AVECIA Limited) for corrosion proofing of the ink, benzotriazole for corrosion proofing of an ink jet head member, and EDTA.2Na salt for reducing the influence of metal ions in the ink system were added to the ion exchanged water added as the "balance" in the following ink composition of Example 1, in amounts of 0.05%, 0.02% and 0.04%, respectively, based on the total weight of the ink.

| | |
|---|---|
| Dispersion 1 <120> | 8.0% |
| SH-3771M | 0.01% |
| Olfine E1010 | 0.6% |
| Diethylene Glycol Monobutyl Ether | 3.0% |
| 1,2-Pentanediol | 2.5% |
| Diethylene Glycol | 3.0% |
| Glycerol | 10.0% |
| Trimethylolpropane | 6.0% |
| Tripropanolamine | 0.3% |
| Ion Exchanged Water | balance |

(3) Evaluation of Print Quality

For the evaluation of print quality, an ink jet printer PX-V700 (manufactured by Seiko Epson Corporation) in which an ink is ejected through an ink jet head using a piezoelectric element (piezo element) was used, and the ink prepared in Example 1 (2) described above was subjected to the evaluation of print quality.

As paper for evaluation, there was used ordinary paper commercially available in Europe, America and Japan. Specifically, there were used (a) Conqueror paper, (b) Reymat paper, (c) Mode Copy paper, (d) Rapid Copy paper, (e) Xerox P paper, (f) Xerox 4024 paper, (g) Xerox 10 paper, (h) Neenha Bond paper, (i) Ricopy 6200 paper and (j) Hammer Mill Copy Plus paper.

The evaluation was visually carried out based on the following evaluation criteria. The results of the evaluation of print quality are shown in Table 2.

A: No blurs are observed in letters of all point types.

B: Blurs are slightly observed in letters of 5- or smaller-point type.

C: Letters of 5- or smaller-point type look thick due to blurs.

D: Blurs are significant, and letters of 5- or smaller-point type cannot be distinguished.

(4) Evaluation of Fixability

Using the printer and ink used in Example 1 (3) described above, fixability to glossy media was evaluated.

As the glossy media for evaluation, there were used glossy media commercially available in Europe, America and Japan. Specifically, there were used (1) Photoprint Paper 2, (2) MC Photographic Paper (both (1) and (2) are trade names, and produced by Seiko Epson Corporation), (3) Ink Jet Paper Photo Glossy Paper Super Photo Grade, (4) Ink Jet Paper Photo Paper High Grade (both (3) and (4) are trade names, and produced by Fuji Photo Film Co., Ltd.), (5) Ink Jet Photographic Quality Paper Photo Weight (trade name, manufactured by Eastman Kodak Co.) and (6) Photo Like QP QP20A4GH (trade name, manufactured by Konica Corp.).

The evaluation was carried out by using printed matter dried under the conditions of 20 to 25° C./40 to 60% RH for 30 minutes after printing, and visually observing the slipped and blurred states of letters which have been rubbed with a finger. Evaluation criteria are shown below. The results of the evaluation of fixability are shown in Table 3.

A: No slipping and blurring (KASURE) are observed.

B: Slipping is slightly observed, but it is at such a level that there is practically no problem.

C: Slipping or blurring (KASURE) is observed.

D: Slipping and blurring (KASURE) are significantly observed, and letters are hard to make out.

(5) Evaluation of Ejection Stability

Using the printer and ink used in Example 1 (4) described above, printing was continuously made on 100 sheets of A4 size Xerox P paper under the circumstances of 35° C./20% RH, and the state of disordered printing was observed, thereby evaluating ejection stability.

The evaluation was visually carried out based on the following evaluation criteria. The results of the evaluation of ejection stability are shown in Table 4.

A: No disordered printing occurs at all.

B: Disordered printing is observed, but at less than 10 portions.

C: Disordered printing is observed within the range of 10 portions to less than 100 portions.

D: Disordered printing occurs at 100 portions or more.

(6) Evaluation of Storage Stability

The ink prepared in Example 1 (2) described above was put in glass bottles. After hermetically sealed, the bottles were allowed to stand at 60° C. for 1 week and −20° C. for 1 week, respectively. Foreign matter generated in the ink and fluctuations in physical property (viscosity) before and after standing were evaluated.

The evaluation was carried out based on the following evaluation criteria. The results of the evaluation of storage stability are shown in Table 4.

A: The ratio of the amount of foreign matter and the physical property after standing at 60° C. or −20° C. to those before standing is within the range of 0.99 to 1.01.

B: The ratio is within the range of 0.95 to 0.99 or 1.01 to 1.05 (a practical level).

C: The ratio is within the range of 0.90 to 0.95 or 1.05 to 1.10.

D: The ratio is less than 0.90 or more than 1.10.

Example 2

(1) Production of Dispersion: Dispersion 2

For the production of dispersion 2 used in Example 2, an insoluble monoazo yellow pigment (C.I. Pigment Yellow 74) which is an organic pigment was used. Except for that, dispersion 2 containing dispersion 2 (a dispersion in which the insoluble monoazo yellow pigment was encapsulated with the polymer having an aromatic ring amount of 25%) in an amount of 20% was obtained in the same manner as in Example 1 (1) described above, but by a method in which synthesis conditions of the polymer were somewhat changed.

The pigment/polymer ratio in dispersion 2 was measured in the same manner as in Example 1 (1) by the method described in the above-mentioned "Measurement of Pigment/Polymer Ratio". As a result, it was 75:25.

(2) Preparation of Ink

In Example 2, there were used dispersion 2 obtained in Example 2 (1) described above, SH-3772M (manufactured by Dow Corning Toray Silicone Co., Ltd.; HLB value=6), an EO-modified silicone, Surfynol 440 (manufactured by Air Products and Chemicals Inc.) and Olfine STG (manufactured by Nissin Chemical Industry Co., Ltd.), acetylene glycol-based surfactants, triethylene glycol monobutyl ether, an alkylene glycol monoalkyl ether, and 1,2-hexanediol, a 1,2-alkylene glycol. The specific composition is shown below.

A value in < > indicates the average particle size (unit: nm) of dispersion 2 measured by the method described in the above-mentioned "Measurement of Average Particle Size".

Further, Proxel XL-2 (manufactured by AVECIA Limited), benzotriazole and EDTA•2Na salt were added in the same manner as in Example 1 (2) to the ion exchanged water added as the "balance" in the following ink composition of Example 2, in amounts of 0.05%, 0.02% and 0.04%, respectively, based on the total weight of the ink.

| | |
|---|---|
| Dispersion 2 <120> | 8.0% |
| SH-3772M | 0.005% |
| Surfynol 440 | 0.4% |
| Olfine STG | 0.1% |
| Triethylene Glycol Monobutyl Ether | 3.0% |
| 1,2-Hexanediol | 2.0% |
| 2-Pyrrolidone | 3.0% |
| Glycerol | 10.0% |
| Trimethylolethane | 3.0% |
| Tripropanolamine | 0.1% |
| Ion Exchanged Water | balance |

(3) Evaluation of Print Quality

Using an ink jet printer PX-V700 (manufactured by Seiko Epson Corporation) in the same manner as in Example 1 (3) described above, the ink prepared in Example 2 (2) described above was subjected to the evaluation of print quality, using the same paper for evaluation as in Example 1 (3) described above according to the same evaluation criteria as in Example 1 (3) described above. The results of the evaluation are shown in Table 2.

(4) Evaluation of Fixability

Using the printer and ink used in Example 2 (3) described above, fixability to glossy media was evaluated using the same glossy media as in Example 1 (4) described above according to the same evaluation criteria as in Example 1 (4) described above. The results of the evaluation are shown in Table 3.

(5) Evaluation of Ejection Stability

Using the printer and ink used in Example 2 (4) described above, ejection stability was evaluated in the same manner as in Example 1 (5) described above according to the same evaluation criteria as in Example 1 (5) described above. The results of the evaluation are shown in Table 4.

(6) Evaluation of Storage Stability

For the ink prepared in Example 2 (2) described above, storage stability was evaluated in the same manner as in Example 1 (6) described above according to the same evaluation criteria as in Example 1 (6) described above. The results of the evaluation are shown in Table 4.

Example 3

(1) Production of Dispersion: Dispersion 3

For the production of dispersion 3 used in Example 3, a quinacridone magenta pigment (C.I. Pigment Magenta 122) which is an organic pigment was used. Except for that, dispersion 3 containing dispersion 3 (a dispersion in which the quinacridone magenta pigment was encapsulated with the polymer having an aromatic ring amount of 25%) in an amount of 20% was obtained in the same manner as in Example 1 (1) described above, but by a method in which synthesis conditions of the polymer were somewhat changed.

The pigment/polymer ratio in dispersion 3 was measured in the same manner as in Example 1 (1) by the method described in the above-mentioned "Measurement of Pigment/Polymer Ratio". As a result, it was 75:25.

(2) Preparation of Ink

In Example 3, there were used dispersion 3 obtained in Example 3 (1) described above, SH-3773M (manufactured by Dow Corning Toray Silicone Co., Ltd.; HLB value=8), an EO-modified silicone, Surfynol 104 (manufactured by Air Products and Chemicals Inc.), an acetylene glycol-based surfactant, and 1,2-hexanediol, a 1,2-alkylene glycol. The specific composition is shown below.

A value in < > indicates the average particle size (unit: nm) of dispersion 3 measured by the method described in the above-mentioned "Measurement of Average Particle Size".

Further, Proxel XL-2 (manufactured by AVECIA Limited), benzotriazole and EDTA.2Na salt were added in the same manner as in Example 1 (2) to the ion exchanged water added as the "balance" in the following ink composition of Example 3, in amounts of 0.05%, 0.02% and 0.04%, respectively, based on the total weight of the ink.

| | |
|---|---|
| Dispersion 3 <100> | 7.4% |
| SH-3773M | 0.005% |
| Surfynol 104 | 0.16% |
| 1,2-Hexanediol | 3.5% |
| 2-Pyrrolidone | 2.0% |
| Glycerol | 13.0% |
| Trimethylolpropane | 8.0% |
| Ion Exchanged Water | balance |

(3) Evaluation of Print Quality

Using an ink jet printer PX-V700 (manufactured by Seiko Epson Corporation) in the same manner as in Example 1 (3) described above, the ink prepared in Example 3 (2) described above was subjected to the evaluation of print quality, using the same paper for evaluation as in Example 1 (3) described above according to the same evaluation criteria as in Example 1 (3) described above. The results of the evaluation are shown in Table 2.

(4) Evaluation of Fixability

Using the printer and ink used in Example 3 (3) described above, fixability to glossy media was evaluated using the same glossy media as in Example 1 (4) described above according to the same evaluation criteria as in Example 1 (4) described above. The results of the evaluation are shown in Table 3.

(5) Evaluation of Ejection Stability

Using the printer and ink used in Example 3 (4) described above, ejection stability was evaluated in the same manner as in Example 1 (5) described above according to the same evaluation criteria as in Example 1 (5) described above. The results of the evaluation are shown in Table 4.

(6) Evaluation of Storage Stability

For the ink prepared in Example 3 (2) described above, storage stability was evaluated in the same manner as in Example 1 (6) described above according to the same evaluation criteria as in Example 1 (6) described above. The results of the evaluation are shown in Table 4.

Example 4

(1) Production of Dispersion: Dispersion 4

For the production of dispersion 4 used in Example 4, a phthalocyanine blue pigment (C.I. Pigment Blue 15:4) which is an organic pigment was used. Except for that, dispersion 4 containing dispersion 4 (a dispersion in which the phthalocyanine blue pigment was encapsulated with the polymer having an aromatic ring amount of 25%) in an amount of 20% was obtained in the same manner as in Example 1 (1) described above, but by a method in which synthesis conditions of the polymer were somewhat changed.

The pigment/polymer ratio in dispersion 4 was measured in the same manner as in Example 1 (1) by the method described in the above-mentioned "Measurement of Pigment/Polymer Ratio". As a result, it was 50:50.

(2) Preparation of Ink

In Example 4, there were used dispersion 4 obtained in Example 4 (1) described above, SH-3775M (manufactured by Dow Corning Toray Silicone Co., Ltd.; HLB value=5), an EO-modified silicone, Surfynol 104 (manufactured by Air Products and Chemicals Inc.), an acetylene glycol-based surfactant, and 1,2-pentanediol, a 1,2-alkylene glycol. The specific composition is shown below.

A value in < > indicates the average particle size (unit: nm) of dispersion 4 measured by the method described in the above-mentioned "Measurement of Average Particle Size".

Further, Proxel XL-2 (manufactured by AVECIA Limited), benzotriazole and EDTA.2Na salt were added in the same manner as in Example 1 (2) to the ion exchanged water added as the "balance" in the following ink composition of Example 4, in amounts of 0.05%, 0.02% and 0.04%, respectively, based on the total weight of the ink.

| | |
|---|---|
| Dispersion 4 <100> | 7.4% |
| SH-3775M | 0.001% |
| Surfynol 104 | 0.16% |
| 1,2-Pentanediol | 3.5% |
| 2-Pyrrolidone | 2.0% |
| Glycerol | 13.0% |
| Trimethylolpropane | 6.0% |
| Ion Exchanged Water | balance |

(3) Evaluation of Print Quality

Using an ink jet printer PX-V700 (manufactured by Seiko Epson Corporation) in the same manner as in Example 1 (3) described above, the ink prepared in Example 4 (2) described above was subjected to the evaluation of print quality, using the same paper for evaluation as in Example 1 (3) described above according to the same evaluation criteria as in Example 1 (3) described above. The results of the evaluation are shown in Table 2.

(4) Evaluation of Fixability

Using the printer and ink used in Example 4 (3) described above, fixability to glossy media was evaluated using the same glossy media as in Example 1 (4) described above according to the same evaluation criteria as in Example 1 (4) described above. The results of the evaluation are shown in Table 3.

(5) Evaluation of Ejection Stability

Using the printer and ink used in Example 4 (4) described above, ejection stability was evaluated in the same manner as in Example 1 (5) described above according to the same evaluation criteria as in Example 1 (5) described above. The results of the evaluation are shown in Table 4.

(6) Evaluation of Storage Stability

For the ink prepared in Example 4 (2) described above, storage stability was evaluated in the same manner as in Example 1 (6) described above according to the same evaluation criteria as in Example 1 (6) described above. The results of the evaluation are shown in Table 4.

Example 5

(1) Production of Dispersion: Dispersion 5

For the production of dispersion 5 used in Example 5, a perinone orange pigment (C.I. Pigment Orange 43) which is an organic pigment was used. Except for that, dispersion 5 containing dispersion 5 (a dispersion in which the perinone orange pigment was encapsulated with the polymer having an aromatic ring amount of 25%) in an amount of 20% was obtained in the same manner as in Example 1 (1) described above, but by a method in which synthesis conditions of the polymer were somewhat changed.

The pigment/polymer ratio in dispersion 5 was measured in the same manner as in Example 1 (1) by the method described in the above-mentioned "Measurement of Pigment/Polymer Ratio". As a result, it was 75:25.

(2) Preparation of Ink

In Example 5, there were used dispersion 5 obtained in Example 5 (1) described above, KF-6017 (manufactured by Shin-Etsu Chemical Co., Ltd.; HLB value=4.5), an EO-modified silicone, Surfynol 420 (manufactured by Air Products and Chemicals Inc.), an acetylene glycol-based surfactant, triethylene glycol monobutyl ether, an alkylene glycol monoalkyl ether, and 1,2-hexanediol, a 1,2-alkylene glycol. The specific composition is shown below.

A value in < > indicates the average particle size (unit: nm) of dispersion 5 measured by the method described in the above-mentioned "Measurement of Average Particle Size".

Further, Proxel XL-2 (manufactured by AVECIA Limited), benzotriazole and EDTA•2Na salt were added in the same manner as in Example 1 (2) to the ion exchanged water added as the "balance" in the following ink composition of Example 5, in amounts of 0.05%, 0.02% and 0.04%, respectively, based on the total weight of the ink.

| | |
|---|---|
| Dispersion 5 <100> | 7.4% |
| KF-6017 | 0.001% |
| Surfynol 420 | 0.14% |
| Triethylene Glycol Monobutyl Ether | 3.0% |
| 1,2-Hexanediol | 2.5% |
| 2-Pyrrolidone | 2.0% |
| Glycerol | 13.0% |
| Trimethylolpropane | 3.0% |
| Ion Exchanged Water | balance |

(3) Evaluation of Print Quality

Using an ink jet printer PX-V700 (manufactured by Seiko Epson Corporation) in the same manner as in Example 1 (3) described above, the ink prepared in Example 5 (2) described above was subjected to the evaluation of print quality, using the same paper for evaluation as in Example 1 (3) described above according to the same evaluation criteria as in Example 1 (3) described above. The results of the evaluation are shown in Table 2.

(4) Evaluation of Fixability

Using the printer and ink used in Example 5 (3) described above, fixability to glossy media was evaluated using the same glossy media as in Example 1 (4) described above according to the same evaluation criteria as in Example 1 (4) described above. The results of the evaluation are shown in Table 3.

(5) Evaluation of Ejection Stability

Using the printer and ink used in Example 5 (4) described above, ejection stability was evaluated in the same manner as in Example 1 (5) described above according to the same evaluation criteria as in Example 1 (5) described above. The results of the evaluation are shown in Table 4.

(6) Evaluation of Storage Stability

For the ink prepared in Example 5 (2) described above, storage stability was evaluated in the same manner as in Example 1 (6) described above according to the same evaluation criteria as in Example 1 (6) described above. The results of the evaluation are shown in Table 4.

Example 6

(1) Production of Dispersion: Dispersion 6

For the production of dispersion 6 used in Example 6, a phthalocyanine green pigment (C.I. Pigment Green 7) which is an organic pigment was used. Except for that, dispersion 6 containing dispersion 6 (a dispersion in which the phthalocyanine green pigment was encapsulated with the polymer having an aromatic ring amount of 25%) in an amount of 20% was obtained in the same manner as in Example 1 (1) described above, but by a method in which synthesis conditions of the polymer were somewhat changed.

The pigment/polymer ratio in dispersion 6 was measured in the same manner as in Example 1 (1) by the method described in the above-mentioned "Measurement of Pigment/Polymer Ratio". As a result, it was 60:40.

(2) Preparation of Ink

In Example 6, there were used dispersion 6 obtained in Example 6 (1) described above, KF-352A (manufactured by Shin-Etsu Chemical Co., Ltd.; HLB value=7), an EO-modified silicone, Surfynol TG (manufactured by Air Products and Chemicals Inc.), an acetylene glycol-based surfactant, triethylene glycol monobutyl ether, an alkylene glycol monoalkyl ether, and 1,2-pentanediol, a 1,2-alkylene glycol. The specific composition is shown below.

A value in < > indicates the average particle size (unit: nm) of dispersion 6 measured by the method described in the above-mentioned "Measurement of Average Particle Size".

Further, Proxel XL-2 (manufactured by AVECIA Limited), benzotriazole and EDTA.2Na salt were added in the same manner as in Example 1 (2) to the ion exchanged water added as the "balance" in the following ink composition of Example 6, in amounts of 0.05%, 0.02% and 0.04%, respectively, based on the total weight of the ink.

| | |
|---|---|
| Dispersion 6 <100> | 6.5% |
| KF-352A | 0.05% |
| Surfynol TG | 0.15% |
| 1,2-Pentanediol | 3.0% |
| 2-Pyrrolidone | 3.0% |
| Glycerol | 15.0% |
| Trimethylolethane | 3.0% |
| Triethanolamine | 0.1% |
| Ion Exchanged Water | balance |

(3) Evaluation of Print Quality

Using an ink jet printer PX-V700 (manufactured by Seiko Epson Corporation) in the same manner as in Example 1 (3) described above, the ink prepared in Example 6 (2) described above was subjected to the evaluation of print quality, using the same paper for evaluation as in Example 1 (3) described above according to the same evaluation criteria as in Example 1 (3) described above. The results of the evaluation are shown in Table 2.

(4) Evaluation of Fixability

Using the printer and ink used in Example 6 (3) described above, fixability to glossy media was evaluated using the same glossy media as in Example 1 (4) described above according to the same evaluation criteria as in Example 1 (4) described above. The results of the evaluation are shown in Table 3.

(5) Evaluation of Ejection Stability

Using the printer and ink used in Example 6 (4) described above, ejection stability was evaluated in the same manner as in Example 1 (5) described above according to the same evaluation criteria as in Example 1 (5) described above. The results of the evaluation are shown in Table 4.

(6) Evaluation of Storage Stability

For the ink prepared in Example 6 (2) described above, storage stability was evaluated in the same manner as in Example 1 (6) described above according to the same evaluation criteria as in Example 1 (6) described above. The results of the evaluation are shown in Table 4.

Example 7

(1) Production of Dispersion: Dispersion 7

For the production of dispersion 7 used in Example 7, a benzimidazolone brown pigment (C.I. Pigment Brown 32) which is an organic pigment was used. Except for that, dispersion 7 containing dispersion 7 (a dispersion in which the benzimidazolone brown pigment was encapsulated with the polymer having an aromatic ring amount of 25%) in an amount of 20% was obtained in the same manner as in Example 1 (1) described above, but by a method in which synthesis conditions of the polymer were somewhat changed.

The pigment/polymer ratio in dispersion 7 was measured in the same manner as in Example 1 (1) by the method described in the above-mentioned "Measurement of Pigment/Polymer Ratio". As a result, it was 75:25.

(2) Preparation of Ink

In Example 7, there were used dispersion 7 obtained in Example 7 (1) described above, SH-3773M and KF-3017, EO-modified silicones, Surfynol 420 (manufactured by Air Products and Chemicals Inc.), an acetylene glycol-based surfactant, triethylene glycol monobutyl ether, an alkylene glycol monoalkyl ether, and 1,2-hexanediol, a 1,2-alkylene glycol. The specific composition is shown below.

A value in < > indicates the average particle size (unit: nm) of dispersion 7 measured by the method described in the above-mentioned "Measurement of Average. Particle Size".

Further, Proxel XL-2 (manufactured by AVECIA Limited), benzotriazole and EDTA.2Na salt were added in the same manner as in Example 1 (2) to the ion exchanged water added as the "balance" in the following ink composition of Example 7, in amounts of 0.05%, 0.02% and 0.04%, respectively, based on the total weight of the ink.

| | |
|---|---|
| Dispersion 7 <100> | 6.4% |
| SH-3773M | 0.003% |
| KF-3017 | 0.002% |
| Surfynol 420 | 0.14% |
| Triethylene Glycol Monobutyl Ether | 1.0% |
| 1,2-Hexanediol | 2.5% |
| 2-Pyrrolidone | 2.0% |
| Glycerol | 8.0% |
| Trimethylolpropane | 10.0% |
| Ion Exchanged Water | balance |

(3) Evaluation of Print Quality

Using an ink jet printer PX-V700 (manufactured by Seiko Epson Corporation) in the same manner as in Example 1 (3) described above, the ink prepared in Example 7 (2) described above was subjected to the evaluation of print quality, using the same paper for evaluation as in Example 1 (3) described above according to the same evaluation criteria as in Example 1 (3) described above. The results of the evaluation are shown in Table 2.

(4) Evaluation of Fixability

Using the printer and ink used in Example 7 (3) described above, fixability to glossy media was evaluated using the same glossy media as in Example 1 (4) described above according to the same evaluation criteria as in Example 1 (4) described above. The results of the evaluation are shown in Table 3.

(5) Evaluation of Ejection Stability

Using the printer and ink used in Example 7 (4) described above, ejection stability was evaluated in the same manner as in Example 1 (5) described above according to the same evaluation criteria as in Example 1 (5) described above. The results of the evaluation are shown in Table 4.

(6) Evaluation of Storage Stability

For the ink prepared in Example 7 (2) described above, storage stability was evaluated in the same manner as in Example 1 (6) described above according to the same evaluation criteria as in Example 1 (6) described above. The results of the evaluation are shown in Table 4.

Example 8

(1) Production of Dispersion: Dispersion 8

For the production of dispersion 8 used in Example 8, a quinacridone violet pigment (C.I. Pigment Violet 19) which is an organic pigment was used. Except for that, dispersion 8 containing dispersion 8 (a dispersion in which the quinacridone violet pigment was encapsulated with the polymer having an aromatic ring amount of 25%) in an amount of 20% was obtained in the same manner as in Example 1 (1) described above, but by a method in which synthesis conditions of the polymer were somewhat changed.

The pigment/polymer ratio in dispersion 8 was measured in the same manner as in Example 1 (1) by the method described in the above-mentioned "Measurement of Pigment/Polymer Ratio". As a result, it was 80:20.

(2) Preparation of Ink

In Example 8, there were used dispersion 8 obtained in Example 8 (1) described above, Form Ban MS-575 containing an EO-modified silicone in an amount of about 8% (manufactured by Ultra Addives Inc.; HLB value of the EO-modified silicone contained=8), Surfynol 104 (manufactured by Air Products and Chemicals Inc.), an acetylene glycol-based surfactant, triethylene glycol monobutyl ether, and 1,2-hexanediol, a 1,2-alkylene glycol. The specific composition is shown below.

A value in < > indicates the average particle size (unit: nm) of dispersion 8 measured by the method described in the above-mentioned "Measurement of Average Particle Size".

Further, Proxel XL-2 (manufactured by AVECIA Limited), benzotriazole and EDTA.2Na salt were added in the same manner as in Example 1 (2) to the ion exchanged water added as the "balance" in the following ink composition of Example 8, in amounts of 0.05%, 0.02% and 0.04%, respectively, based on the total weight of the ink.

| | |
|---|---|
| Dispersion 8 <100> | 7.5% |
| Form Ban MS-575 | 0.005% |
| Surfynol 104 | 0.16% |
| 1,2-Hexanediol | 3.0% |
| 2-Pyrrolidone | 2.0% |
| Glycerol | 15.0% |
| Trimethylolpropane | 5.0% |
| Ion Exchanged Water | balance |

(3) Evaluation of Print Quality

Using an ink jet printer PX-V700 (manufactured by Seiko Epson Corporation) in the same manner as in Example 1 (3) described above, the ink prepared in Example 8 (2) described above was subjected to the evaluation of print quality, using the same paper for evaluation as in Example 1 (3) described above according to the same evaluation criteria as in Example 1 (3) described above. The results of the evaluation are shown in Table 2.

(4) Evaluation of Fixability

Using the printer and ink used in Example 8 (3) described above, fixability to glossy media was evaluated using the same glossy media as in Example 1 (4) described above according to the same evaluation criteria as in Example 1 (4) described above. The results of the evaluation are shown in Table 3.

(5) Evaluation of Ejection Stability

Using the printer and ink used in Example 8 (4) described above, ejection stability was evaluated in the same manner as in Example 1 (5) described above according to the same evaluation criteria as in Example 1 (5) described above. The results of the evaluation are shown in Table 4.

(6) Evaluation of Storage Stability

For the ink prepared in Example 8 (2) described above, storage stability was evaluated in the same manner as in Example 1 (6) described above according to the same evaluation criteria as in Example 1 (6) described above. The results of the evaluation are shown in Table 4.

Comparative Example 1

(1) Preparation of Ink

In Comparative Example 1, the same composition as in Example 1 was used with the exception that SH-3771M, an EO-modified silicone, was excluded. The specific composition is shown below.

| | |
|---|---|
| Dispersion 1 <120> | 8.0% |
| Olfine E1010 | 0.6% |
| Diethylene Glycol Monobutyl Ether | 3.0% |
| 1,2-Pentanediol | 2.5% |
| Diethylene Glycol | 3.0% |
| Glycerol | 10.0% |
| Trimethylolpropane | 6.0% |
| Tripropanolamine | 0.3% |
| Ion Exchanged Water | balance |

(2) Evaluation of Print Quality

Using an ink jet printer PX-V700 (manufactured by Seiko Epson Corporation) in the same manner as in Example 1 (3) described above, the ink prepared in Comparative Example 1 (1) described above was subjected to the evaluation of print quality, using the same paper for evaluation as in Example 1 (3) described above according to the same evaluation criteria as in Example 1 (3) described above. The results of the evaluation are shown in Table 2.

(3) Evaluation of Fixability

Using the printer and ink used in Comparative Example 1 (2) described above, fixability to glossy media was evaluated using the same glossy media as in Example 1 (4) described above according to the same evaluation criteria as in Example 1 (4) described above. The results of the evaluation are shown in Table 3.

(4) Evaluation of Ejection Stability

Using the printer and ink used in Comparative Example 1 (3) described above, ejection stability was evaluated in the same manner as in Example 1 (5) described above according to the same evaluation criteria as in Example 1 (5) described above. The results of the evaluation are shown in Table 4.

(5) Evaluation of Storage Stability

For the ink prepared in Comparative Example 1 (1) described above, storage stability was evaluated in the same manner as in Example 1 (6) described above according to the same evaluation criteria as in Example 1 (6) described above. The results of the evaluation are shown in Table 4.

Details of the modified silicone compounds used in the above-mentioned Examples and Comparative Example are shown in the following Table 1.

TABLE 1

$-(SiMe_2-O)_x-(SiMe-(C_3H_6-(EO)a-(PO)b)-O)y-$

| | Example 1 SH-3771M | Example 2 SH-3772M | Example 3 SH-3773M | Example 4 SH-3775M | Example 5 KF-6017 | Example 6 KF-352A | Example 7 SH-3773M | Example 8 Form Ban MS-575 |
|---|---|---|---|---|---|---|---|---|
| Y (mol %) | 24.5 | 5.9 | 9.6 | 4.5 | 6.4 | 20.5 | 9.6 | 4.5 |
| a (mol) | 13.9 | 15.1 | 14.2 | 13.1 | 7.0 | 13.8 | 14.2 | 13.1 |
| b (mol) | 0 | 0 | 0 | 0 | 0 | 13.6 | 0 | 0 |
| EO/Si Ratio | 3.41 | 0.89 | 1.36 | 0.59 | 0.45 | 2.83 | 1.36 | 0.59 |
| HLB Value | 13 | 6 | 8 | 5 | 4.5 | 7 | 8 | 5 |

TABLE 2

Evaluation Results of Printing of Inks According to Respective Examples and Comparative Example

| | Example | | | | | | | | Comparative |
|---|---|---|---|---|---|---|---|---|---|
| Paper for Evaluation | 1 | 2 | 3 | 4 | 5 | 6 | 7 | 8 | Example 1 |
| (a) Conqueror Paper | A | A | A | A | A | A | A | A | C |
| (b) Reymat Paper | A | A | A | A | A | A | A | A | C |
| (c) Mode Copy Paper | B | B | B | B | B | B | B | B | D |
| (d) Rapid Copy Paper | A | A | A | A | A | A | A | A | C |
| (e) Xerox P Paper | A | A | A | A | A | A | A | A | C |
| (f) Xerox 4024 Paper | A | A | A | A | A | A | A | A | C |
| (g) Xerox 10 Paper | A | A | A | A | A | A | A | A | C |
| (h) Neenha Bond Paper | B | A | A | A | B | B | B | A | D |
| (i) Ricopy 6200 Paper | A | A | A | A | A | A | A | A | C |
| (j) Hammer Mill Copy Plus Paper | B | B | A | A | B | B | B | A | D |

TABLE 3

Evaluation Results of Fixability of Inks According to Respective Examples and Comparative Example

| Paper for Evaluation | Example | | | | | | | | Comparative Example 1 |
|---|---|---|---|---|---|---|---|---|---|
| | 1 | 2 | 3 | 4 | 5 | 6 | 7 | 8 | |
| (1) Photoprint Paper 2, | A | A | A | A | A | A | A | A | D |
| (2) MC Photographic Paper | A | A | A | A | A | A | A | A | D |
| (3) Ink Jet Paper Photo Glossy Paper Super Photo Grade | A | A | A | A | A | A | A | A | C |
| (4) Ink Jet Paper Photo Paper High Grade | A | A | A | A | A | A | A | A | C |
| (5) Ink Jet Photographic Quality Paper Photo Weight | A | A | A | A | A | A | A | A | C |
| (6) Photo Like QP QP20A4GH | A | A | A | A | A | A | A | A | D |

TABLE 4

Evaluation Results of Ejection Stability and Storage Stability of Inks According to Respective Examples and Comparative Example

| | Example | | | | | | | | Comparative Example 1 |
|---|---|---|---|---|---|---|---|---|---|
| | 1 | 2 | 3 | 4 | 5 | 6 | 7 | 8 | |
| Ejection Stability | C | A | A | B | B | C | A | B | D |
| Foreign Matter | A | A | A | A | A | A | A | A | A |
| Viscosity | A | A | A | A | A | A | A | A | A |

While the present invention has been described in detail and with reference to specific embodiments thereof, it will be apparent to one skilled in the art that various changes and modifications can be made therein without departing from the spirit and scope thereof.

This application is based on Japanese Patent Application Nos. 2003-310447 (fled Sep. 2, 2003) and 2004-250774 (filed Aug. 30, 2004), the contents thereof being herein incorporated by reference.

What is claimed is:

1. An aqueous ink comprising a dispersion in which a colorant is encapsulated with a polymer to make it dispersible in water, wherein the polymer has aromatic rings in an amount of from 20% by weight to 70% by weight based on the weight of the polymer, and further, the ink contains a compound represented by the following formula:

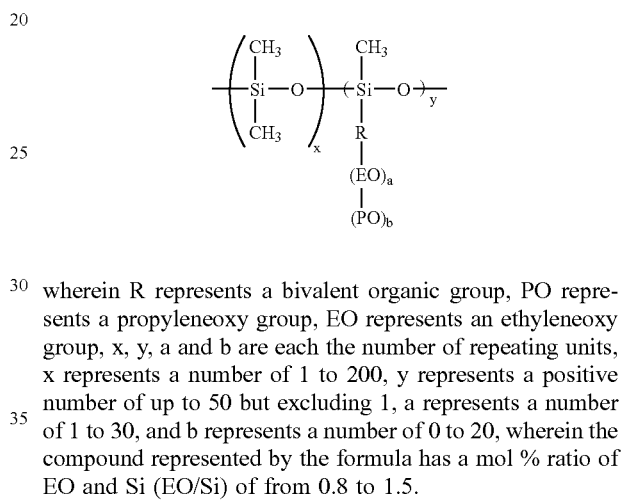

wherein R represents a bivalent organic group, PO represents a propyleneoxy group, EO represents an ethyleneoxy group, x, y, a and b are each the number of repeating units, x represents a number of 1 to 200, y represents a positive number of up to 50 but excluding 1, a represents a number of 1 to 30, and b represents a number of 0 to 20, wherein the compound represented by the formula has a mol % ratio of EO and Si (EO/Si) of from 0.8 to 1.5.

2. The aqueous ink according to claim 1, wherein the compound represented by the formula is present in the aqueous ink in an amount effective to improve the ejection stability of the ink as compared with the ink without the compound represented by the formula, said amount being within the range of 0.0001 to 0.1% by weight.

* * * * *